United States Patent Office 2,878,183
Patented Mar. 17, 1959

2,878,183

ANION EXCHANGE COMPOUNDS

Curt Schuster and Robert Gehm, Ludwigshafen (Rhine), Germany, assignors to Badische Anilin- & Soda-Fabrik Aktiengesellschaft, Ludwigshafen (Rhine), Germany No Drawing. Application December 23, 1953
Serial No. 400,094

Claims priority, application Germany
December 27, 1952

15 Claims. (Cl. 210—37)

This invention relates to the use of polymers or copolymers of vinylimidazole or its derivates, as anion exchange compounds.

We have found that the polymers or copolymers of vinylimidazole or its derivatives, which swell but do not dissolve in water, are excellent anion exchange compounds. Suitable initial materials for the building up of such exchange compounds are N-vinylimidazole, its derivatives substituted on one or more of the cyclic combined carbon atoms, as for example N-vinyl-2-methyl-imidazole, N-vinyl-2-phenyl-imidazole, N-vinyl-2-methylol-imidazole, N-vinyl-2-hydroxyethyl-imidazole and also N-vinyl-4,5-benzimidazole and its derivatives substituted in the benzene nucleus (group A).

Further suitable initial materials for building up the said compounds are the quaternary ammonium compounds derived from the abovementioned compounds by adding thereto alkyl halides, alkyl sulphuric acid esters or other compounds which are known to be suitable for the production of quaternary ammonium compounds (group B).

Other suitable initial materials for the production of the anion exchange compounds according to this invention are the multiple quaternary ammonium compounds which are obtained by the reaction of two or more molecules of the abovementioned vinylimidazole bases with one molecule of a bifunctionally or polyfunctionally alkylating compound, as for example 1,4-dichlorbutane, dichlormethylxylene and the like (group C).

Copolymers of the above-mentioned classes of compounds with each other or with other non-basic polymerisable compounds may also be built up and used. Such compounds can be monovinyl or divinyl compounds, as for example styrene, acrylonitrile, vinyl acetate, vinyl chloride, vinylpyrrolidone, and acrylic acid ester (group D).

Examples of divinyl compounds are divinyl benzene and divinylimidazolidone (group E).

From the components described above, the exchange compounds according to this invention can be built up in different ways usual in polymerisation technique.

They can also be obtained by preparing a polymer or copolymer of the substances comprised within groups A, D, and E and subsequently treating them with one or more of the substances specified under groups B and C so that quaternary ammonium groups are formed.

The products are resinous substances which may be brought into various forms and grain sizes for use as exchange compounds.

The anion exchange compounds according to this invention have the advantage over other anion exchange compounds that the molecular weight of the basic components, i. e. the imidazole, is very small. Consequently they are characterised by a high capacity because the molecular weight of the basic components determines the activity of the exchange compound.

The following examples will further illustrate this invention but the invention is not restricted to these examples. The parts are parts by weight.

Example 1

By copolymerisation of 110 parts of the quaternary ammonium compound (I) of N-vinylimidazole and benzyl chloride and 50 parts of the biquaternary ammonium compound (II) of vinylimidazole and dichlormethylxylene, a resinous polymer is obtained in granular form by causing the quaternary ammonium compound (I) and the biquaternary ammonium compound (II) in the stated amounts to melt by heating on a waterbath and mixing them by stirring. After adding one of the usual polymerization catalysts, the melt is further stirred for some time while heating until it has been converted into a solid, resinous, friable mass, and then washed out with water. One gram of this exchange compound, when added to an aqueous solution containing chlorine ions, is capable of binding 50 to 60 milli-equivalents.

Example 2

A copolymer is prepared from 47 parts of N-vinylimidazole and 17.2 parts of divinylimidazolidone, and is obtained in the form of a solid, yellow-coloured resin. The capacity of this exchange compound is about 5 milli-equivalents per gram.

Example 3

47 parts of N-vinylimidazole are mixed with 50 parts of concentrated hydrochloric acid. Into this solution there are introduced 21 parts of the biquaternary ammonium compound prepared by reaction of vinylbenzimidazole and dichlormethylxylene. After adding 0.3 part of 30 percent hydrogen peroxide the mixture is heated to 70° C. and the polymerisation carried out in the course of 3 hours. A gel-like brown mass is obtained which swells strongly in water and is suitable as an anion exchanger.

Example 4

40 parts of vinylpyrrolidone are mixed with 15 parts of water and 20 parts of the biquaternary ammonium compound prepared by reaction of N-vinyl-2-methylolimidazole and dichlormethylxylene are introduced. After heating to about 100° C., 0.2 part of 30 percent hydrogen peroxide are added to the solution which is clear after filtration, and after a polymerisation time of one hour a pale brown jelly is obtained with the properties of an anion exchange compound.

Example 5

20 parts of a biquaternary ammonium salt prepared from N-vinylbenzimidazole and dichlormethylxylene are dissolved in 20 parts of water while heating to 80° C. After the addition of 0.2 part of 30 percent hydrogen peroxide, polymerisation occurs rapidly on the waterbath with the formation of a brown solid and friable mass which swells a little in water and can be used as an anion exchanger.

What we claim is:

1. Process of removing anions from aqueous solutions which comprises interacting the anions present in said aqueous solutions with a water-insoluble, water-swellable polymeric substance selected from the group consisting of (I) a homopolymer of an N-vinylimidazole and (II) a copolymer of (a) an N-vinylimidazole and (b) a non-basic polymerizable divinyl compound selected from the group consisting of divinyl benzene and divinylimidazolidone and (III) the quaternized compounds of at least one of the polymeric substances (I) and (II).

2. Process of removing anions from aqueous solutions which comprises interacting the anions present in said aqueous solutions with a water-insoluble, water-swellable copolymer of an N-vinylimidazole and a non-basic polymerizable divinyl compound selected from the group consisting of divinyl benzene and divinylimidazolidone.

3. Process of removing anions from aqueous solutions which comprises interacting the anions present in said aqueous solutions with a water-insoluble, water-swellable copolymer of an N-vinylimidazole and a non-basic polymerizable divinyl compound selected from the group consisting of divinyl benzene and divinylimidazolidone and wherein the polymer is a quaternized bi-functional compound selected from the group consisting of alkyl halogenides, alkyl sulphuric acid esters, 1,4-dichlorobutane and dichloro methyl xylene.

4. A process of removing anions from aqueous solutions which comprises interacting the anions present in said aqueous solutions with a water-insoluble, water-swellable polymeric substance which is a copolymer of a quaternized N-vinylimidazole, the quaternizing agent being a member selected from the group consisting of alkyl halogenides, alkyl sulphuric acid esters, 1,4-dichloro butane and dichloro methyl xylene and a non-basic polymerizable divinyl compound selected from the group consisting of divinyl benzene and divinylimidazolidone.

5. Process of removing anions from aqueous solutions which comprises interacting the anions present in said aqueous solutions with a water-insoluble, water-swellable polymeric substance which is a copolymer of N-vinylimidazole and a divinyl compound selected from the group consisting of divinyl benzene and divinylimidazolidone, said copolymer being quaternized with a mono-functional alkylating agent.

6. Process of removing anions from aqueous solutions which comprises interacting the anions present in said aqueous solutions with a water-insoluble, water-swellable polymeric substance which is a copolymer of N-vinylimidazole quaternized with a mono-functional alkylating agent and a divinyl compound selected from the group consisting of divinyl benzene and divinylimidazolidone.

7. Process of removing anions from aqueous solutions which comprises interacting the anions present in said aqueous solutions with a water-insoluble, water-swellable polymeric substance which is a polymer of a quaternized N-vinylimidazole, the quaternizing component being a bi-functional compound selected from the group consisting of alkyl halogenides, alkyl sulphuric acid esters, 1,4-dichlorobutane and dichloro methyl xylene.

8. Process of removing anions from aqueous solutions which comprises interacting the anions present in said aqueous solutions with a water-insoluble, water-swellable polymeric substance which is a quaternized poly-N-vinylimidazole, the quaternizing component being a bi-functional compound selected from the group consisting of alkyl halogenides, alkyl sulphuric acid esters, 1,4-dichlorobutane and dichloro methyl xylene.

9. Process of removing anions from aqueous solutions which comprises interacting the anions present in said aqueous solutions with a water-insoluble, water-swellable polymeric substance which is a copolymer of N-vinylimidazole and a quaternized N-vinylimidazole, the quaternizing agent whereof is a member of the group consisting of alkyl halogenides, alkyl sulphuric acid esters, 1,4-dichloro butane and dichloro methyl xylene.

10. Process of removing anions from aqueous solutions which comprises interacting the anions present in said aqueous solutions with a water-insoluble, water-swellable polymeric substance which is a copolymer of a quaternized N-vinylimidazole, the quaternizing agents being a mono-functional alkyl alkylating agent and a quaternized N-vinylimidazole, the quaternizing component of which is selected from bi-functional compounds of the group consisting of alkyl halogenides, alkyl sulphuric acid esters, 1,4-dichloro butane and dichloro methyl xylene.

11. Process of removing anions from aqueous solutions which comprises interacting the anions present in said aqueous solutions with a water-insoluble, water-swellable polymeric substance which is a copolymer of a quaternized N-vinylimidazole whereof the quaternizing agent is a mono-functional alkylating agent and a quaternized N-vinylimidazole whereof the quaternizing agent is a member of the group consisting of alkyl halogenides, alkyl sulphuric acid esters, 1,4-dichloro butane and dichloro methyl xylene.

12. Process of removing anions from aqueous solutions which comprises interacting the anions present in said aqueous solutions with a water-insoluble, water-swellable polymeric substance which is a copolymer of a quaternized N-vinylimidazole, the quaternizing component whereof is a mono-functional alkylating agent, a quaternized N-vinylimidazole, the quaternizing component whereof is a bi-functional compound selected from the group consisting of alkyl halogenides, alkyl sulphuric acid esters, 1,4-dichloro butane and dichloro methyl xylene, and a non-basic polymerizable divinyl compound selected from the group consisting of divinyl benzene and divinylimidazolidone.

13. A process in accordance with claim 1 wherein the polymeric substances include vinyl compounds selected from the group consisting of styrene, acrylonitrile, vinyl acetate, vinyl chloride, vinyl pyrrolidone and acrylic acid esters, copolymerized within said polymeric substances.

14. Process in accordance with claim 1 wherein the N-vinylimidazole contains, linked to one of the nuclear carbon atoms, a member of the group consisting of lower alkyl, phenyl and hydroxy lower alkyl radicals.

15. Process of removing anions from aqueous solutions which comprises interacting the anions present in said aqueous solutions with a water-insoluble, water-swellable polymeric substance which is a polymer of quaternized N-vinylimidazole.

References Cited in the file of this patent
UNITED STATES PATENTS

| | | |
|---|---|---|
| 2,540,984 | Jackson | Feb. 6, 1951 |
| 2,540,985 | Jackson | Feb. 6, 1951 |
| 2,603,621 | Craig et al. | July 15, 1952 |
| 2,606,175 | Price | Aug. 5, 1952 |
| 2,611,768 | Butler et al. | Sept. 23, 1952 |
| 2,623,879 | Ringwold et al. | Dec. 30, 1952 |
| 2,643,990 | Ham | June 30, 1953 |
| 2,824,844 | Gilwood | Feb. 25, 1958 |

FOREIGN PATENTS

| | | |
|---|---|---|
| 708,262 | Germany | July 16, 1941 |
| 847,347 | Germany | Aug. 21, 1952 |

OTHER REFERENCES

Bachman et al.: Jour. Am. Chem. Soc., vol. 71, 1949, pages 1985–1988.